United States Patent [19]

Casad et al.

[11] Patent Number: 4,986,355

[45] Date of Patent: Jan. 22, 1991

[54] PROCESS FOR THE PREPARATION OF FLUID LOSS ADDITIVE AND GEL BREAKER

[75] Inventors: Burton M. Casad; Charles R. Clark; Lisa A. Cantu, all of Ponca City, Okla.; D. Philip Cords, Newark; Edward F. McBride, Wilmington, both of Del.

[73] Assignee: Conoco Inc., Ponca City, Okla.

[21] Appl. No.: 353,947

[22] Filed: May 18, 1989

[51] Int. Cl.$^5$ .................. E21B 33/138; E21B 43/26
[52] U.S. Cl. .................... 166/295; 166/281; 166/283; 252/8.551; 523/130
[58] Field of Search ............ 166/281, 282, 283, 295; 175/72; 405/264; 252/8.551, 8.512; 523/130

[56] References Cited

U.S. PATENT DOCUMENTS

| | | | |
|---|---|---|---|
| 3,990,978 | 11/1976 | Hill | 166/308 |
| 4,387,769 | 6/1983 | Erbstoesser et al. | 166/295 |
| 4,526,695 | 7/1985 | Erbstoesser et al. | 166/295 X |
| 4,715,967 | 12/1987 | Bellis et al. | 252/8.551 |
| 4,848,467 | 7/1989 | Cantu et al. | 166/283 X |

FOREIGN PATENT DOCUMENTS 2047305 11/1979 United Kingdom .

Primary Examiner—George A. Suchfield

[57] ABSTRACT

A melted polymer of hydroxyacetic acid with itself or with other hydroxy-, carboxylic acid-, or hydroxycarboxylic acid-containing moieties is subjected to high shear and injected into an organic liquid which is inert to the polymer to form an organic liquid dispersion of very fine polymer particles. In one aspect the melted polymer is combined with the organic liquid and the combination is thereafter subjected to high shear to form the fine particle polymer dispersion. A dispersion agent may also be used to aid in dispersing the particles. The dispersion is used for fluid loss control and gel breaking in subterranean formations.

7 Claims, No Drawings

PROCESS FOR THE PREPARATION OF FLUID LOSS ADDITIVE AND GEL BREAKER

BACKGROUND AND SUMMARY OF THE INVENTION

At various times during the life of a well formed in a subterranean formation for the production of oil and gas, it is desirable to treat the well. Such treatments include perforating, gravel packing, fracturing, and acidizing. These treatments generally involve filling the wellbore with a standing or circulating treating fluid. Although high fluid permeability is an important characteristic of a hydrocarbon-producing formation, these treatments may be adversely affected by loss of treating fluid into the highly permeable formations. For example, in an acidizing treatment where it is desired to treat the least permeable formation to improve its permeability, the formation strata having the highest permeability will most likely consume the major portion of the treatment fluid leaving the least permeable formation strata virtually untreated. Therefore, it is desired to control the loss of treating fluids to the high permeability formations during such treatments. During fracturing treatments it is desirable to control loss of the treating fluid to formation to maintain a wedging effect and propagate the fracture. During perforating operations, it is desirable to prevent fluids from entering the formation and damaging the formation. During gravel pack operations, it is desirable to recover the expensive workover fluids from the wellbore after completion of the operation. Therefore, the efficient performance of various treatments of the wellbore require temporarily reducing permeability of formation strata to reduce the loss of treating fluid to these formation strata during treatment. Several fluid loss agents have been developed for use in these treatments.

One type of fluid loss agent which has been used is the oil-soluble, water insoluble compound, such as soaps, gels, waxes and various types of polymers or resins. Water soluble and acid degradable polymeric fluid loss agents are also used. Still another type of fluid loss agent comprises finely divided solids dispersed in the treating fluid, such as crushed naphthalenes and benzoic acid crushed oyster shells, silica flour or guar-coated silica flour or crushed limestone and rock salt.

A particularly useful example of finely divided solids employed as a fluid loss additive is polyhydroxyacetic acid and copolymers of hydroxyacetic acid with other compounds containing hydroxy-, carboxylic acid-, or hydroxycarboxylic acid-moieties. These materials, when ground to a very small particle size, have been found to be very effective fluid loss additives in both fracturing fluids and well completion or workover fluids. When these compounds are used in higher temperature wells $>150°$ F. the polymers hydrolyze and the resulting products are very effective gel breakers. However, at lower temperatures the rate of hydrolysis is too slow to be effective. The hydrolysis rate at low temperatures can be increased by increasing the ratio of lactic acid or other comonomers to hydroxyacetic acid. However, the resulting copolymer is too soft to grind or otherwise to create the very small particle size required to provide good fluid loss control.

Gels are used in the hydraulic fracturing of subterranean formations to carry proppants between the fractured formations to increase the flow capacity of the formation. These gels are damaging viscous materials, such as gels of hydroxypropyl guar and hydroxyethyl cellulose. The process may be applied to new wells to increase productivity or to old wells to restore productivity. In a typical fracturing process, a thickened fluid, such as an aqueous gel or emulsion, is utilized. The thickened fluid increases the fracturing effect and also supports proppant material which is deposited in the fractures created by the process.

When fluid loss additives are included in the fracturing fluid, a gel filter pad comprising fluid loss additive and gel material forms on the surfaces of the wellbore and the fractures created by the process. It is usually necessary to follow the fracturing treatment with gel breaking and/or gel filter pad removal steps. These steps often recover only a small fraction of the potential productivity of the well.

It is desirable to provide a polymer product of hydroxyacetic acid which is effective as a fluid loss agent and also acts as a gel breaker, and in particular, a polymer product which is effective for these purposes at low formation temperatures.

In accordance with this invention, a material which is a fluid loss additive and is also effective as a gel breaker is prepared by subjecting a melted polymer of hydroxyacetic acid with itself or with other hydroxy-, carboxylic acid-, or hydroxycarboxylic acid-containing moieties to high shear and injecting the sheared polymer into an organic liquid which is inert to the polymer to form an organic liquid external dispersion of very fine polymer particles. In one aspect of the invention the melted polymer is combined with the organic liquid and the combination is thereafter subjected to high shear to form a very fine particle polymer dispersion in the organic liquid. In another aspect of the invention, a copolymer is used and the amount of comonomer combined with the hydroxyacetic acid is controlled to provide a copolymer which hydrolyzes at low temperature.

THE PRIOR ART

British Patent No. 2,047,305 discloses the use of hydroxyacetic acid in an acidic aqueous workover and completion fluid.

U.S. Pat. Nos. 4,526,695 and 4,387,769 disclose compositions for reducing the permeability of subterranean formations. The compositions comprise copolymers of glycolide and lactide.

U.S. Pat. No. 3,990,978 discloses the testing of hydroxyacetic acid as a breaker of gelled kerosene. The test was not successful.

U.S. Pat. No. 4,715,967 discloses the use of the condensation product of hydroxyacetic acid with itself and with compounds containing other hydroxy-, carboxylic acid-, or hydroxycarboxylic acid moieties as a fluid loss additive. Details concerning molecular weight and particle size of the condensed product are given. The patent also discloses the use of condensation products of hydroxyacetic acid and other compounds at lower temperatures and degradation of the condensed products in the presence of water.

DETAILED DESCRIPTION OF THE INVENTION

The polymers and copolymers used in the process of the present invention comprise the low molecular weight polymer product of hydroxyacetic acid with itself or with other compounds containing hydroxy-, carboxylic acid- or hydroxycarboxylic acid moieties. The polymers are pliable solids with a melting point of greater than 65° C. and generally with a degree of crystallinity. They have a number average molecular weight of 200 to 600 or higher and preferably are oligomers having a number average molecular weight of about 200 to about 400. They are primarily trimers up through decamers.

The compounds containing the moieties with which the hydroxyacetic acid is copolymerized include but are not limited to lactic acid, tribasic acids such as citric acid, dibasic acids such as adipic acid, and diols such as ethylene glycol and polyols. They also include difunctional molecules such as 2,2-(bishydroxymethyl) propanoic acid. Copolymerizing hydroxyacetic acid with different molecules produces varied physical and hydrolytic properties, thus permitting the treatment agent to be tailored to the oil well temperatures and treatment timing considerations. Preferred copolymerizing molecules are lactic acid, citric acid, 2,2-(bishydoxymethyl) propanoic acid, trimethylol-ethane, and adipic acid. The most preferred are lactic acid and citric acid.

The polymers and copolymers have the desirable feature of hydrolyzing in the presence of water to form oil and water soluble monomers and dimers. In this degraded state they are easily displaced (or produced) from the formation after they have performed their function of sealing off highly permeable formations during well formation treatments. The rate of degradation of the polymers and copolymers depends primarily on polymer composition and formation temperature. If the formation temperature is sufficiently high all of the polymers and copolymers will degrade over a period of time. At lower temperatures e.g. below about 150° F. the polymers of hydroxyacetic with itself degrade very slowly. However, when hydroxyacetic acid is copolymerized with other compounds containing hydroxy-, carboxylic acid- or hydroxycarboxylic acid- moieties the resulting copolymers degrade much more rapidly, even at further reduced temperatures. For example, copolymers of hydroxyacetic acid with lactic acid and citric acid degrade at a much faster rate than polyhydroxy-acetic acid.

The amount of comonomer used in the copolymer will vary depending on the particular compound used and the rate of hydrolysis desired. In general the rate of hydrolysis increases with increased amounts of the comonomer. If desired more than one comonomer may be used, e.g. lactic acid and citric acid; lactic acid and 2,2(bishydroxymethyl) propanoic acid; etc. The total amount of comonomer or comonomers used will ordinarily be between about 5 and about 10 weight percent of the copolymer; however, up to 15 weight percent or more of comonomer may be employed if desired.

The polymers and copolymers are made by methods well known in the art. The hydroxyacetic acid may be polymerized with itself or with the other copolymerizing molecules discussed above in the presence of a catalyst such as antimony trioxide. The polymerization is preferably carried out in an inert atmosphere and at 30 to 60 mm vacuum. By varying the percentages of hydroxy acetic acid and the copolymerized compounds as well as the temperatures and time of polymerization, it is possible to tailor the polymerization product to degrade at different rates for given wellbore temperatures.

As pointed out previously, the polymers of hydroxyacetic acid with itself and with other compounds containing hydroxy-, carboxylic acid- and hydroxycarboxylic acid- moieties find particular application in the treatment of subterranean formations when they are used in a finely divided state. Unfortunately the copolymers of hydroxyacetic acid which are most effective for use in low temperature formations are too soft to grind or otherwise provide by mechanical means the very small particle size required for good fluid loss control. The process of the invention provides an effective method for obtaining a fine distribution of polymer in the form of an organic liquid external dispersion. The particle size obtained in the dispersion may be varied as desired without regard to the physical properties (e.g. softness) of the polymer. In carrying out the process of the invention, melted polymer (or copolymer) is subjected to high shear to form a very fine dispersion of polymer particles in an inert organic liquid. In one aspect of the invention the melted polymer is subjected to high shear and then injected or sprayed into the organic liquid. In another aspect the melted polymer and organic liquid are combined and the combination is subjected to high shear.

The inert organic liquids which are used in the process of the invention include such materials as diesel oil or mineral oil, or other solvents, such as chlorofluoro compounds, straight or branched chain alcohols containing alkyl groups with 4 to 18 carbon atoms and glycols. In general, any organic liquid which is inert to the polymer and does not adversely affect the formation may be used in carrying out the invention. The amount of organic liquid used in the process will vary from between about 20 and about 50 weight percent of the organic liquid-polymer or copolymer mixture, and preferably between about 30 and about 40 weight percent.

Depending on the particular polymer or copolymer used and the inert organic liquid chosen, it may be desirable to use a dispersion agent, e.g. an emulsion stabilizing agent or surfactant to aid in the formation of and to maintain the polymer particle dispersion. Typical dispersion agents include such materials as alkali metal alkysulfonates in which the alkyl group contains 10 to 16 carbon atoms, alkyl quaternary ammoniums halides in which the alkyl group contains 8 to 16 carbon atoms, alkali metal alkylbenzene sulfonates in which the alkyl group contains 8 to 12 carbon atoms, alkali metal dialkyl disulfonated diphenyloxides in which the alkyl group contains 8 to 12 carbon atoms and other common surfactants. Specific surfactants which may be used include sodium dodecylsulfonate, tetradecyl ammonium chloride, sodium dodecylbenzene sulfonate and sodium dodecyl disulfonated diphenyloxide.

When used the dispersion agent will usually constitute from about 1 to about 0.01 weight percent, based on the polymer or copolymer, and preferably between about 0.1 and about 0.01 weight percent.

Shearing of melted polymer prior to injection of the polymer into the inert organic liquid is usually effected by passing the polymer through a nozzle or nozzles under high pressure so that the polymer is broken up into very fine particles. Upon entering the organic liquid the polymer particles are effectively distributed to form a dispersion of very fine particles. When a dispersion agent is used it will normally be combined with the inert organic liquid prior to injection of the sheared polymer.

When the mixture of polymer and organic diluent (and optionally dispersion agent) is subjected to shearing a variety of devices, including homogenizers, high shear mixers or recirculation through nozzles may be used to form the desired dispersion. In carrying out this aspect of the invention, melted polymer which has not been subjected to high shear is injected or sprayed into the inert organic liquid. Thereafter the mixture of polymer and organic liquid (and optionally dispersion agent) is subjected to high shear until a stable organic liquid external dispersion is formed. The shearing is continued until the particle size of the polymer is in the desired range, then the mixture is cooled. The result again is a very fine dispersion of polymer in the organic liquid.

The particle size of the polymer in the dispersion will usually vary from about 0.5 microns to about 40 microns. However, the average size of the particles will be from about 10 microns to about 20 microns, and preferably from about 12 microns to about 15 microns.

The polymer dispersion is usually introduced into the oil wellbore and/or subterranean formation in a wellbore fluid which may comprise water, oil, xylene, toluene, brines, water-in-oil emulsions or oil-in-water emulsions. The brines may contain small amounts of soluble salts of potassium, sodium or calcium in water. In addition, other soluble salts may be used; however, chloride salts are employed because of their availability. In addition to the above, the wellbore fluid may contain other components additives and the like known to those skilled in the art.

The amount of polymeric solids required for a successful fluid loss treatment will vary widely depending upon the size of the formation, the degree of permeability of the formation, the size of the polymer particles and permissible fluid loss volumes. However, from about 100 to about 250 pounds of polymer per 100 barrels of treatment fluid will be sufficient for most applications.

The polymer dispersions may be used to reduce the permeability of oil bearing formations in conjunction with various conventional well treatments, e.g. perforating, gravel packing fracturing and acidizing. They are particularly useful during fracturing, especially when gels are used in the fracturing operation. Then the dispersions serve the dual function of preventing fluid loss and removal of the gel material from the formation after fracturing is completed.

The polymeric materials used in the process of the invention have a number of advantages. The polymers are insoluble in both water and oil and therefore may be easily introduced into wellbores and subterranean oil formations without degradation. In the presence of water they degrade at specific rates to oil and water soluble materials which do not accumulate in the well or formation. The polymeric materials used are heavier than water and thus, would not be apt to be carried from the formation with produced water or oil. There is always water flow in a formation. However, often there is only a small amount of oil present. Also, the amount of water produced from a formation usually increases with the age of a well. Thus, there is always water present to degrade the polymeric materials.

While the two aspects of the invention, shearing of the melted polymer prior to its introduction to the inert organic liquid and shearing of the mixture of polymer and organic liquid, are independent and separate procedures, they may, if desired, be carried out in combination. Thus the melted polymer may be subjected to shear to provide particles of intermediate size, injected into the inert organic liquid and the combination subjected to additional shear to provide the desired dispersion of very fine particles of polymer.

The following examples illustrate the results obtained in carrying out the invention.

EXAMPLE 1

A mixture of 276 pounds of 70% hydroxyacetic acid, 26 pounds of 88% lactic acid and 18 grams of antimony trioxide are heated under nitrogen to 170° C. The molten mixture is pumped through a high shear blender at 1000 psi into 100 gallons of diesel fuel at 150° F. to form a dispersion of copolymer particles in the diesel fuel. The particles in the dispersion range in size from 1 to 100 microns, with an average particle size of 20 microns.

EXAMPLE 2

Oil is produced at a rate of 50 barrels per operating day from a well traversing a formation with a bottom hole temperature of 100° F. and a bottom hole pressure of 100 psi. 10,000 gallons of water is mixed with 500 pounds of hydroxypropyl guar gum. To the mixture is added 60,000 pounds of 20/40 mesh sand and 400 pounds of the copolymer (dispersed in diesel fuel), prepared in Example 1. The total mixture is pumped into the well to effect fracturing of the formation at a rate of 420 gallons per minute and then allowed to set for a period of 24 hours. In the formation the guar gum and sand form a cake on the face of the fracture. As the copolymer degrades with time and temperature, the cake breaks down to flowable material which is removed from the formation when the well is placed in production. The resulting clean fracture increases the well's production to 500 barrels per operating day.

While certain embodiments and details have been shown for the purpose of illustrating the present invention, it will be apparent to those skilled in the art that various changes and modifications may be made herein without departing from the spirit or scope of the invention.

We claim:

1. A process for reducing the permeability of a subterranean formation penetrated by a wellbore which comprises:
    (1) combining a melted polymer of hydroxyacetic acid polymerized with itself or with other hydroxy-, carboxylic acid, or hydroxycarboxylic acid-moieties, and an organic liquid inert to the polymer,
    (2) subjecting the resulting combination of melted polymer and organic liquid to high shear to form an organic liquid external dispersion of very fine particles of polymer in said organic liquid; and
    (3) introducing said dispersion into said wellbore.

2. The process of claim 1 in which the polymer is a copolymer of hydroxyacetic acid with at least one compound selected from the group consisting of citric acid, lactic acid, trimethylol-ethane, 2,2-(bishydroxy-methyl) propanoic acid and adipic acid, wherein said at least one compound comprises up to about 15% by weight of said copolymer.

3. The process of claim 2 in which said copolymer has a number average molecular weight of from about 200 to 600.

4. The process of claim 3 in which said copolymer is a copolymer of hydroxyacetic acid and lactic acid.

5. The process of claim 2 in which the temperature of said subterranean formation is below about 150° F.

6. The process of claim 1 wherein a dispersion agent is combined with said melted polymer and organic liquid prior to subjecting said combination to high shear.

7. A process for reducing the permeability of a subterranean formation penetrated by a wellbore which comprises:
   (1) subjecting to high shear a melted polymer of hydroxyacetic acid polymerized with itself or with up to 15 percent by weight of other hydroxy-, carboxylic acid-, or hydroxycarboxylic acid-moieties;
   (2) injecting said melted polymer which has been subjected to high shear into an organic liquid inert to said polymer; and
   (3) introducing the resulting polymer and organic liquid combination into said wellbore.

* * * * *